United States Patent [19]

Webber

[11] Patent Number: 5,514,491
[45] Date of Patent: May 7, 1996

[54] NONAQUEOUS CELL HAVING A LITHIUM IODIDE-ETHER ELECTROLYTE

[75] Inventor: Andrew Webber, Avon Lake, Ohio

[73] Assignee: Eveready Battery Company, Inc., St. Louis, Mo.

[21] Appl. No.: 161,377

[22] Filed: Dec. 2, 1993

[51] Int. Cl.[6] .......................... H01M 10/40; H01M 4/58
[52] U.S. Cl. .......................... 429/194; 429/197; 429/199; 429/221
[58] Field of Search .................................. 429/221, 194, 429/197, 199

[56] References Cited

U.S. PATENT DOCUMENTS

| | | | |
|---|---|---|---|
| H829 | 10/1990 | Behl | 429/194 |
| 3,423,242 | 1/1969 | Meyers et al. | 136/6 |
| 3,607,413 | 9/1971 | Buzzelli | 136/76 |
| 3,762,954 | 10/1973 | Metcalfe, III et al. | 136/22 |
| 3,778,310 | 12/1973 | Garth | 136/100 |
| 3,796,604 | 3/1974 | Gabano et al. | 429/221 X |
| 3,811,947 | 5/1974 | Metcalfe, III et al. | 136/6 LF |
| 3,957,532 | 5/1976 | Settle et al. | 136/75 |
| 3,959,012 | 5/1976 | Liang et al. | 429/221 X |
| 3,996,069 | 12/1976 | Kronenberg | 429/197 |
| 4,071,665 | 1/1978 | Garth | 429/197 |
| 4,129,691 | 12/1978 | Broussely | 429/197 |
| 4,228,224 | 10/1980 | Heredy et al. | 429/112 |
| 4,228,227 | 10/1980 | Saathoff et al. | 429/194 |
| 4,275,129 | 6/1981 | Kappus et al. | 429/112 |
| 4,284,692 | 8/1981 | Rao et al. | 429/194 |
| 4,335,191 | 6/1982 | Peled | 429/94 |
| 4,416,960 | 11/1983 | Eustace et al. | 429/194 |
| 4,436,796 | 3/1984 | Huggins et al. | 429/112 |
| 4,450,214 | 5/1984 | Davis | 429/194 |
| 4,482,613 | 11/1984 | Turchan et al. | 429/53 |
| 4,489,143 | 12/1984 | Gilbert et al. | 429/103 |
| 4,489,144 | 12/1984 | Clark | 429/196 |
| 4,532,195 | 7/1985 | Weddigen | 429/213 |
| 4,540,642 | 9/1985 | Kaun | 429/221 X |
| 4,717,634 | 1/1988 | Daifuku et al. | 429/213 |
| 4,728,590 | 3/1988 | Redey | 429/221 |
| 4,803,137 | 2/1989 | Miyazaki et al. | 429/194 |
| 4,808,499 | 2/1989 | Nagai et al. | 429/218 |
| 4,814,242 | 3/1989 | Maxfield et al. | 429/217 |
| 4,849,309 | 7/1989 | Redey et al. | 429/221 X |
| 4,861,573 | 8/1989 | deNeufville et al. | 423/464 |
| 4,952,330 | 8/1990 | Leger et al. | 252/62.2 |
| 4,956,247 | 9/1990 | Miyazaki et al. | 429/194 |
| 5,229,227 | 7/1993 | Webber | 429/197 |

FOREIGN PATENT DOCUMENTS

| | | | |
|---|---|---|---|
| 1174274 | 9/1984 | Canada | H01M 6/16 |
| 0049082 | 4/1982 | European Pat. Off. | H01M 4/50 |
| 2252628 | 6/1975 | France | H01M 6/16 |
| 48-33811 | 10/1973 | Japan . | |
| 56-38744 | 4/1981 | Japan | H01M 6/16 |
| 57-50772 | 3/1982 | Japan | H01M 6/16 |
| 59-173977 | 10/1984 | Japan | H01M 10/40 |
| 59-173961 | 10/1984 | Japan | H01M 4/62 |
| 63-102163 | 5/1988 | Japan | H01M 4/06 |
| 63-226881 | 9/1988 | Japan | H01M 4/40 |
| 63-257183A | 10/1988 | Japan . | |
| 63-257183 | 10/1988 | Japan | H01M 6/16 |
| 01-134873 | 5/1989 | Japan | H01M 10/40 |
| 1232661 | 9/1989 | Japan | H01M 4/06 |
| 03-37964 | 2/1991 | Japan | H01M 6/14 |
| 1510642 | 5/1978 | United Kingdom | H01M 10/39 |
| 1583981 | 2/1981 | United Kingdom | H01M 10/39 |
| 2087132 | 5/1982 | United Kingdom | H01M 10/40 |
| 2157065 | 10/1985 | United Kingdom | H01M 10/39 |
| WO92/13366 | 8/1992 | WIPO | H01M 10/39 |

*Primary Examiner*—Stephen Kalafut
*Attorney, Agent, or Firm*—Robert W. Welsh

[57] ABSTRACT

A nonaqueous cell employing a pure lithium or lithium alloy anode, an iron sulfide-containing cathode, such as $FeS_2$, and a liquid organic electrolyte consisting of lithium iodide dissolved in at least a 97 percent by volume ether solvent such as a mixture of 1,3-dioxolane and 1,2-dimethoxyethane.

20 Claims, No Drawings

NONAQUEOUS CELL HAVING A LITHIUM IODIDE-ETHER ELECTROLYTE

FIELD OF THE INVENTION

The invention relates to a nonaqueous cell, such as a Li/FeS$_2$ cell, employing an electrolyte of a lithium iodide (LiI) solute dissolved in a solvent consisting of at least a 97 volume percent ether solvent.

BACKGROUND OF THE INVENTION

The battery has become a primary power source for many portable electronic devices, such as cassette players, compact disc players, cameras and photoflash attachments. Many of these devices draw large currents from the battery. Effective batteries for such devices must therefore be capable of delivering their capacity efficiently under high current drains. Such batteries are often termed "high-rate" batteries. Cameras and photoflash units, in particular, can be very demanding of their power sources. Recently, a commercial Li-FeS$_2$ cell has been developed which provides excellent power for such devices. In photoflash applications, these batteries can provide many times the number of flashes than can conventional alkaline Zn-MnO$_2$ cells.

According to U.S. patent application No. 744,179, the performance of this high-rate Li-FeS$_2$ cell is best if the electrolyte is a blend of 1,3-dioxolane (DIOX) and 1,2-dimethoxyethane (DME) such that the amount of DME is greater than that of the DIOX. A small amount, about 0.2 percent by volume, of 3,5-dimethylisoxazole (DMI) is often added, following the teaching of U.S. Pat. Nos. 3,778,310 and 4,489,144. The subject of this invention is the use of lithium iodide as a sole solute in solvent blends consisting essentially of only ethers in Li-FeS$_2$ cells. All-ether electrolytes are those where the solvent blend comprises at least 97% by volume of a mixture of ethers, regardless of whether or not small amounts (less than about 3%) of additives, such as DMI are present.

U.S. Pat. No. 4,450,214 reports on the use of lithium halides in Li-FeS$_2$ cells. This patent deals only with the use of lithium halides (mostly lithium chloride) as an additive or co-solute, another lithium salt being the main salt. The halide is claimed to improve cell stability. This patent does not indicate any advantage for using the lithium iodide over other lithium halides. This patent discloses the use of the lithium halides in a 3Me2Ox:DIOX:DME:DMI solvent blend, where 3Me2Ox denotes 3-methyl-2-oxazolidone. It has been observed that solvent blends containing such polar solvents as 3Me2Ox, propylene carbonate and ethylene carbonate give poor high-rate performance in Li-FeS$_2$ cells regardless of the solute. Such solvent blends are not so desirable for use in high-rate Li-FeS$_2$ cells as the all-ether solvent blends disclosed in U.S. patent application No. 744,179. We have found that lithium chloride and lithium bromide cannot be used in these all-ether blends in Li-FeS$_2$ cells. These salts cause the cells to be unstable. This is contrary to what one would have expected from U.S. Pat. No. 4,450,214 where lithium chloride was used to improve cell stability. However, it was discovered that in all-ether solvent blends, lithium iodide gives unexpectedly good performance. It was observed that this electrolyte gives the highest rate capability of any salt tested in these formulations and lithium iodide is best used as the sole solute of the electrolyte, not merely as an additive. In particular, the other soluble lithium halides (chloride and bromide) cannot be used at all in all-ether electrolytes. This advantage for the iodide salt is thus completely unexpected in light of the prior art in the area.

U.S. Statutory Invention Registration H829 discloses the use of lithium bromide as an additive for overcharge protection in rechargeable lithium cells but only with TiS$_2$, MoO$_3$, Cr$_2$O$_3$, V$_2$O$_5$, V$_6$O$_{13}$ and V$_2$S$_5$ cathodes. These cathodes have a much higher voltage than the FeS$_2$ cathode of this invention. This Invention Registration states that lithium iodide is an unfavorable additive and that lithium bromide is the preferred additive. Consequently, this article, dealing with the rechargeable cells, actually teaches away from using lithium iodide.

U.S. Pat. No. 4,532,195 teaches the use of lithium iodide in conjunction with a polymer cathode in a rechargeable lithium battery. However, in such applications, the iodide is used as a dopant in that the iodide is electrochemically inserted into the structure of the cathode during a charging step. Similar reports have been disclosed of using iodide salts to dope carbonaceous materials. The cathode of this invention is FeS$_2$. Generally, only a small amount of carbon (5%) is present in the cathode to improve conductivity. Since these cells are not charged before use, the dopant effects of the iodide salt clearly play no role in this invention.

U.S. Pat. No. 4,228,227 teaches the use of lithium iodide as an additive to LiAsF$_6$ dissolved in tetrahydrofuran (THF). This invention is claimed to improve rechargeability and does not teach that lithium iodide would be advantageous in primary high-rate Li-FeS$_2$ cells. Moreover, it uses lithium iodide only as a co-solute with LiAsF$_6$, not as the sole solute.

The use of lithium iodide was reported for lithium cells in Unexamined Japanese Patent Application 56-38744. However, this reference deals only with Li-CF$_x$ cells and only using iodide as an additive or co-solute. In fact, it teaches that high concentrations of iodide (above 0.2M) are actually undesirable, i.e., the opposite of this invention.

It is an object of this invention to provide a nonaqueous lithium cell that has an improved high rate discharge capability.

Another object of the present invention is to provide a nonaqueous lithium cell that can provide high rate discharge even after storage at elevated temperatures.

Another object of the present invention is to provide a Li/FeS$_2$ cell that has an improved high rate discharge capability even after storage at elevated temperatures.

The foregoing and additional objects will become more apparent from the following description.

SUMMARY OF THE INVENTION

The invention relates to a nonaqueous cell comprising a lithium anode, an iron sulfide-containing cathode and a liquid organic electrolyte consisting of lithium iodide dissolved in a solvent comprising at least a 97 percent by volume ether solvent. As used herein an ether solvent shall mean a single ether solvent or a mixture of two or more ether solvents. Suitable ether solvents would be at least one ether solvent selected from the group consisting of 1,3-dioxolane (DIOX), 1,1- or 1,2-dimethoxyethane, 2-methyltetrahydrofuran, tetrahydrofuran (THF), glymes such as diglyme, triglyme and tetraglyme, and substituted dioxolanes such as 4-methyl-dioxolane. The preferred ether solvent would be a mixture of 1,3-dioxolane and 1,2-dimethoxyethane with or without a small amount of 3,5-dimethylisoxazole. Preferably the ether solvent would comprise about 20 to about 30 volume percent 1,3-dioxolane, about 70 to about 80 volume percent 1,2-dimethoxyethane with about 0.1 to about 0.3 volume percent 3,5-dimethylisoxazole. The most preferred ether solvent would be about 25 volume percent 1,3-dioxolane, about 75 volume percent 1,2-dimethoxyethane with about 0.2 volume percent 3,5-dimethylisoxazole.

The lithium iodide concentration can vary from 0.2 mole to 2.0 moles per liter of the solvent. The preferred concentration would be 0.4 mole to 1.5 moles per liter of the solvent with about 0.75 mole to 1.0 mole per liter being the most preferred. As used herein M shall mean moles of solute per liter of the solvent. As also used herein the lithium anode is intended to mean pure lithium and lithium alloys such as a lithium-aluminum alloy containing, e.g., 0.02 to 2.0 weight percent aluminum.

It has been discovered that the use of only the solute lithium iodide in at least a 97 percent by volume ether solvent will provide an excellent electrolyte for Li/FeS$_2$ cells. Specifically, using the specific electrolyte of this invention in a Li/FeS$_2$ cell will provide a cell that has improved high rate discharge performance even after being stored at relatively high temperatures.

EXAMPLE 1

Several AA size cells were produced with a lithium anode, FeS$_2$-containing cathode and an electrolyte of 25 volume percent 1,3-dioxolane, 75 volume percent 1,2-dimethoxyethane and 0.2 volume percent 3,5-dimethylisoxazole with a solute as shown in Table 1. Each cell was stored at 60° C. for three weeks and then discharged across a 3.9 ohm resistor and the voltage of the cell with time was observed. The data obtained are shown in Table 1.

EXAMPLE 2

Additional AA size cells were produced as in Example 1 with the same electrolytes as shown in Table 2. The closed circuit voltage (CCV) and the impedance of the cells were measured. The cells were then tested for photoflash performance using a modified camera photoflash. Two AA cells were used to power the flash of a Pentax PC303 camera. The shutter and rewind circuitry were disabled to improve the reliability of the test. The flash recovery time after each of two flashes, 30 seconds apart, was recorded. The flash recovery is the time it takes for the camera light to come on after each flash. It is desirable that recovery time be as short as possible. The data obtained for these cells are shown in Table 2. The data in Table 2 show that the cells containing the LiI solute performed the best in all tests.

TABLE 1

| Sample 1<br>1.0 M LiCF$_3$SO$_3$ | | Sample 2<br>0.5 M LiCF$_3$SO$_3$<br>plus Satd* LiCl | | Sample 3<br>0.5 M LiCF$_3$SO$_3$<br>plus 0.5 M LiBr | | Sample 4<br>0.5 M LiCF$_3$SO$_3$<br>plus 0.5 M LiI | |
| --- | --- | --- | --- | --- | --- | --- | --- |
| Time (min) | Voltage (volts) | Time (min) | Voltage (volts) | Time (min) | Voltage (volts) | Time (min) | Voltage (volts) |
| 0 | 1.56 | 0 | 0.25 | 0 | 1.27 | 0 | 1.6 |
| 60 | 1.34 | 60 | 0.08 | 60 | 1.23 | 60 | 1.35 |
| 120 | 1.32 | 120 | 0.06 | 120 | 1.22 | 120 | 1.34 |
| 180 | 1.30 | 180 | 0.05 | 180 | 1.22 | 180 | 1.32 |
| 240 | 1.28 | 240 | 0.05 | 240 | 1.18 | 240 | 1.29 |
| 300 | 1.24 | 300 | 0.05 | 300 | 1.13 | 300 | 1.25 |
| 360 | 1.15 | 360 | 0.05 | 360 | 1.03 | 360 | 1.14 |
| 420 | 0.85 | 420 | 0.04 | 420 | 0.77 | 420 | 0.78 |
| 480 | 0.56 | 480 | 0.04 | 480 | 0.56 | 480 | 0.54 |

*Satd = saturated

The data show that the cells containing the lithium iodide solute had good high rate discharge characteristics and gave a better operating voltage than the cells containing the LiCl or LiBr solute or only the LiCF$_3$SO$_3$ solute.

TABLE 2

| | CCV | IMPEDANCE DATA (Ohms) | | | FLASH RECOVERY (Seconds) | |
| --- | --- | --- | --- | --- | --- | --- |
| Electrolyte Solute | (V) | 10 KHz | 1 KHz | 10 Hz | 1ST FLASH | 2ND FLASH |
| 1 M LiCF$_3$SO$_3$ | 1.64 | 0.14 | 0.17 | 0.20 | 3.06 | 3.35 |
| Satd.* LiCl +<br>0.5 M LiCF$_3$SO$_3$ | 0.92 | 0.60 | 1.41 | 2.87 | >25 | — |

TABLE 2-continued

| Electrolyte Solute | CCV (V) | IMPEDANCE DATA (Ohms) | | | FLASH RECOVERY (Seconds) | |
|---|---|---|---|---|---|---|
| | | 10 KHz | 1 KHz | 10 Hz | 1ST FLASH | 2ND FLASH |
| 0.5 M LiBr + 0.5 M LiCF$_3$SO$_3$ | 1.63 | 0.16 | 0.19 | 0.23 | 3.23 | 3.55 |
| 0.5 M LiI + 0.5 M LiCF$_3$SO$_3$ | 1.66 | 0.11 | 0.13 | 0.16 | 2.74 | 2.94 |

*Satd = saturated

EXAMPLE 3

Cells were produced as in Example 1 with the same electrolyte using the solute as shown in Table 3. After three weeks storage at 60° C., the average impedance, closed circuit voltage and flash recovery time were determined for the cells and the data are shown in Table 3. The data show that the cells containing the LiI solute gave the best test results.

TABLE 3

| Electrolyte | Impedance 1 KHz (Ω) | CCV (V) | Flash Recovery (Seconds) | |
|---|---|---|---|---|
| | | | 1st Flash | 2nd Flash |
| *Satd. LiCl + 0.5 M LiCF$_3$SO$_3$ | 7.28 | 0.295 | >15 | >15 |
| 0.5 M LiBr + 0.5 M LiCF$_3$SO$_3$ | 3.04 | 1.002 | >15 | >15 |
| 0.5 M LiI + 0.5 M LiCF$_3$SO$_3$ | 0.50 | 1.523 | 4.0 | 3.6 |
| 1.0 M LiCF$_3$SO$_3$ | 0.50 | 1.542 | 4.1 | 3.9 |

*Satd = saturated

EXAMPLE 4

Additional cells were produced as in Example 1 except that the solute was either LiI or LiCF$_3$SO$_3$ in the mole concentration as shown in Table 4 and the volume of the solvent is also as shown in Table 4. The cells were used to provide a photoflash using a National PE 320S flash attachment. This was operated in a full power mode which places a heavy drain on the cell. The flash recovery time was observed for ten flashes, spaced 30 seconds apart. The average flash recovery data obtained are shown in Table 4. These data clearly indicate the better performance of the cells using only the LiI solute over the cells using only the LiCF$_3$SO$_3$ solute.

TABLE 4

| Solvent Volume (mL) | Average Recovery Time for Ten Flashes - Seconds | | | |
|---|---|---|---|---|
| | LiCF$_3$SO$_3$ | | LiI | |
| | 1 M | 0.75 M | 1 M | 0.75 M |
| 1.8 | 10.1 | 10.9 | 7.9 | 8.4 |
| 1.5 | 10.3 | 10.7 | 8.2 | 8.4 |
| 1.2 | — | 10.9 | — | 8.7 |

EXAMPLE 5

Additional cells were produced as in Example 4 and the voltage drop after 10 milliseconds on a 1.5 ampere pulse was noted. The data obtained are shown in Table 5 and demonstrate the superior performance of the cells containing LiI as the only solute.

TABLE 5

| ELECTROLYTE SOLUTE | | | | | |
|---|---|---|---|---|---|
| LiCF$_3$SO$_3$ | | | LiI | | |
| Mole per liter of solvent | Fill Vol. (ml) | Voltage Drop (mV) | Mole per liter of solvent | Fill Vol. (ml) | Voltage Drop (mV) |
| 1 | 1.8 | 329 | 1 | 1.8 | 193 |
| 1 | 1.5 | 306 | 1 | 1.5 | 203 |
| 0.75 | 1.8 | 340 | 0.75 | 1.8 | 203 |
| 0.75 | 1.5 | 360 | 0.75 | 1.5 | 215 |
| 0.75 | 1.2 | 411 | 0.75 | 1.2 | 247 |

Thus the invention has been described with respect to the preferred embodiments thereof, many variations and modifications will become apparent to those skilled in the art. It is therefore the intention that the appended claims be interpreted as broadly as possible in view of the prior art to include all such variations and modifications.

What is claimed:

1. A nonaqueous cell comprising a lithium anode, an iron sulfide-containing cathode and a liquid organic electrolyte consisting of lithium iodide dissolved in a solvent, said solvent containing at least 97 percent by volume of an ether solvent composed of at least one ether.

2. The nonaqueous cell of claim 1 wherein the ether solvent is at least one ether solvent selected from the group consisting of 1,3-dioxolane, 1,1- and 1,2-dimethoxyethane, 2-methyltetrahydrofuran, tetrahydrofuran, diglyme, triglyme, tetraglyme and substituted dioxolanes.

3. The nonaqueous cell of claim 2 wherein the ether solvent is a mixture of about 20 to about 30 volume percent 1,3-dioxolane and about 70 to about 80 volume percent 1,2-dimethoxyethane with about 0.1 to about 0.3 volume percent 3,5-dimethylisoxazole.

4. The nonaqueous cell of claim 3 wherein the ether solvent is a mixture of about 25 volume percent 1,3-dioxolane and about 75 volume percent 1,2-dimethoxyethane with about 0.2 volume percent 3,5-dimethylisoxazole.

5. The nonaqueous cell of claim 1 wherein the concentration of the lithium iodide in the ether solvent is between 0.2 mole to 2.0 moles per liter of solvent.

6. The nonaqueous cell of claim 2 wherein the concentration of lithium iodide in the ether solvent is between 0.4 mole to 1.5 moles per liter of solvent.

7. The nonaqueous cell of claim 6 wherein the concentration of the lithium iodide in the ether solvent is about 0.75 mole to about 1.0 mole per liter of solvent.

8. The nonaqueous cell of claim 6 wherein the ether solvent is a mixture of about 20 to about 30 volume percent 1,3-dioxolane and about 70 to about 80 volume percent 1,2-dimethoxyethane with about 0.1 to about 0.3 volume percent 3,5-dimethylisoxazole.

9. The nonaqueous cell of claim 1 wherein the iron sulfide-containing cathode is $FeS_2$.

10. The nonaqueous cell of claim 9 wherein the ether solvent is a mixture of about 20 to about 30 volume percent 1,3-dioxolane and about 70 to about 80 volume percent 1,2-dimethoxyethane with about 0.1 to about 0.3 volume percent 3,5-dimethylisoxazole.

11. The nonaqueous cell of claim 10 wherein the concentration of lithium iodide in the ether solvent is between about 0.4 mole to about 1.5 moles per liter of solvent.

12. The nonaqueous cell of claim 10 wherein the ether solvent is a mixture of about 25 volume percent 1,3-dioxolane and about 75 volume percent 1,2-dimethoxyethane with about 0.2 volume percent 3,5-dimethylisoxazole.

13. The nonaqueous cell of claim 12 wherein the concentration of lithium iodide in the ether solvent is between about 0.4 mole to about 1.5 moles per liter of solvent.

14. The nonaqueous cell of claim 1 wherein the anode as selected from the group consisting of pure lithium and a lithium alloy.

15. The nonaqueous cell of claim 14 wherein the ether solvent is a mixture of about 20 to about 30 volume percent 1,3-dioxolane and 70 to 80 volume percent 1,2-dimethoxyethane with about 0.1 to about 0.3 volume percent 3,5-dimethylisoxazole.

16. The nonaqueous cell of claim 15 wherein the concentration of lithium iodide in the ether solvent is between about 0.4 mole to about 1.5 moles per liter of solvent.

17. The nonaqueous cell of claim 16 wherein the anode is pure lithium.

18. The non aqueous cell of claim 16 wherein the anode is a lithium alloy containing aluminum.

19. The nonaqueous cell of claim 15 wherein the ether solvent is a mixture of about 25 volume percent 1,3-dioxolane and about 75 volume percent 1,2-dimethoxyethane with about 0.2 volume percent 3,5-dimethylisoxazole, and the lithium iodide in the ether solvent is between about 0.75 mole and about 1.0 mole per liter of solvent.

20. The nonaqueous cell of cell 19 wherein the cathode is $FeS_2$.

* * * * *